US007837873B2

(12) United States Patent
Nakamura

(10) Patent No.: US 7,837,873 B2
(45) Date of Patent: Nov. 23, 2010

(54) METHOD AND APPARATUS FOR PRODUCING PURIFIED BOTANICAL OIL

(75) Inventor: Katsuro Nakamura, Tokyo (JP)

(73) Assignee: for-C Co. Ltd., Tokyo (JP)

( * ) Notice: Subject to any disclaimer, the term of this patent is extended or adjusted under 35 U.S.C. 154(b) by 0 days.

(21) Appl. No.: 12/768,498

(22) Filed: Apr. 27, 2010

(65) Prior Publication Data

US 2010/0249440 A1 Sep. 30, 2010

Related U.S. Application Data

(63) Continuation of application No. 12/163,732, filed on Jun. 27, 2008, which is a continuation of application No. PCT/JP2006/326191, filed on Dec. 28, 2006.

(30) Foreign Application Priority Data

Dec. 28, 2005 (JP) ............................ 2005-379197

(51) Int. Cl.
*B01D 15/08* (2006.01)

(52) U.S. Cl. .................................................. 210/198.3

(58) Field of Classification Search ............... 210/198.3
See application file for complete search history.

(56) References Cited

FOREIGN PATENT DOCUMENTS

| | | |
|---|---|---|
| CN | 1498823 A | 5/2004 |
| JP | 5027823 | 9/1975 |
| JP | 61259719 | 11/1986 |
| JP | 810539 | 1/1996 |
| JP | 2001354992 | 12/2001 |
| JP | 2004143313 | 5/2004 |

OTHER PUBLICATIONS

International Search Report and Written Opinion for PCT/JP2006/326191 dated Mar. 20, 2007.

Wu, "Measure of Reducing Trans Fatty Acid Content in Edible Oils," China Oils and Fats, 30(3):42-44 (2005). Abstract Only.

Chinese Office Action for Application No. 200680049941.8, dated May 25, 2010.

*Primary Examiner*—Deborah D Carr
(74) *Attorney, Agent, or Firm*—Marshall, Gerstein & Borun LLP

(57) ABSTRACT

Disclosed is a method for producing botanical oil with no by-produced trans fatty acids comprising the steps of;

(1) introducing a raw oil obtained by squeezing plant seeds into a column having activated carbon filled therein from the upper part of the column;

(2) allowing the oil to transfer in the column by the action of gravity toward the lower part of the column and allowing the oil to discharge from the column through a filter cloth placed adjacent to the bottom part of the activated carbon layer, wherein the filter cloth has a pore size of 13 to 45 μm, and (3) introducing the oil discharged from the column into an activated carbon separation device comprising a filter having a pore size of 3-7 μm, and discharging from said separation device an oil having no activated carbon microparticles by the action of a sucking force.

8 Claims, 3 Drawing Sheets

METHOD AND APPARATUS FOR PRODUCING PURIFIED BOTANICAL OIL

CROSS-REFERENCE TO RELATED APPLICATIONS

This is a continuation of U.S. application Ser. No. 12/163,732 filed Jun. 27, 2008, which is a continuation of PCT/JP2006/326191 filed Dec. 28, 2006, which claims the priority benefit under USC 119 of JP 2005 379197 filed Dec. 28, 2005, the entire respective disclosures of which are incorporated herein by reference.

TECHNICAL FIELD

The present invention relates to a method and apparatus for producing botanical oil exclusive of by-produced trans fatty acids by purifying botanical oil (raw oil) without excess heating and optionally hydrogenating it.

BACKGROUND OF THE INVENTION

Botanical oils for edible and cosmetic use are produced for example by squeezing seeds of plants which have high oil content. Purification of botanical oils generally includes the steps of degumming, deacidification, bleaching, deodorizing, etc. by which phospholipids, free fatty acids, coloring matters, odorous substances, etc. are removed. Purified botanical oils are used in a wide variety of applications such as for edible and cosmetic uses.

Oils from plants generally include a plurality of polyunsaturated fatty acids with a varying number of carbon to carbon double bonds, such as monovalent (oleic acid 18:1), divalent (linoleic acid 18:2) and trivalent (alpha-linoleic acid 18:3), and the property of botanical oil is decided based on the composition of said fatty acids within the oil. Even in "camellia oils", it is said that, in camellia oils originating from *Camellia japonica*, the content of oleic acid is 85 mass % (hereinafter, %) and the content of linoleic acid is 4.1%, whereas in camellia oils originating from *Camellia sasanqua*, it is said that the content of oleic acid is 83.3% and the content of linoleic acid is 7.4%. As shown above, camellia oils from *Camellia japonica* have a lower content of carbon-carbon double bonds compared to camellia oils from *Camellia sasanqua* (Oil and Oil ingredient Handbook (Yushi, Yuryou Handbook); Edited by Yoshiro Abe; Saiwai Shobo (1988)).

Parameter "iodine value" is used to identify the property of such fatty acid composition of botanical oils. Iodine value is an indication of the amount of carbon-carbon double bonds of polyunsaturated fatty acids, and when the iodine value is high, i.e. when a botanical oil comprises many polyunsaturated fatty acids, such oil is easily oxidized and has a tendency to discolor and denature. Therefore, in order to retain or raise the quality of the oil, hydrogenation is usually carried out during the degumming and/or the deacidification step to reduce the amount of carbon-carbon double bonds.

Most of the "camellia oils" that are currently commercially available use oils from *Camellia oleifera* produced in China as their ingredient. Oil of *Camellia oleifera* is positioned at about the center of oil of *Camellia japonica* and oil of *Camellia sasanqua*, and its iodine value is often slightly above 83. As described above, camellia oils with high iodine value are easily oxidized. Therefore, it is important to reduce the iodine value when producing purified botanical oils (for example, iodine value in the range of 78 to 83 in the case of camellia oil).

Among the aforementioned purification and hydrogenations steps of botanical oils, the most commonly used has been the purification with the application of heat. Examples of processing steps in heat-purification are as follows; degumming: water is added to raw oil and stirred with the application of heat after which phospholipids, etc. are removed following centrifugation; deacidification: the degummed oil is stirred under heat with sodium hydroxide after which free fatty acids are converted to soap and removed; bleaching: clay is added to the deacidified oil whereby coloring matters are removed; deodoring: the bleached oil is steam-distilled in vacuo by which traces of volatile odorous substances are removed (Oil and Oil ingredient Handbook (Yushi, Yuryou Handbook); Edited by Yoshiro Abe; Saiwai Shobo (1988)). In addition, there is also a hydrogenation step in which hydrogen is introduced into oil by which hydrogen is added to the unsaturated bond portion of the fatty acid, and this hydrogenation step is generally carried out at high temperatures, e.g. heating treatment at a high temperature of 230° C. is sometimes carried out for reactions for oil and hydrogen.

As shown above, the steps of purification and hydrogenation were mainly carried out at high temperatures, but such steps involving heating at high temperatures induce denaturation of fatty acid compositions and produces trans isomers which do not exist in nature. In recent years, researchers in countries throughout the world have pointed out that the intake of such trans fatty acids has negative effects on health, and first in Europe and then, in 2005, the United States have enforced a law requiring identification of content of trans fatty acids in edible oils. Awareness of danger of trans fatty acids is growing in Japan, and there is a need for a method for purifying and hydrogenating botanical oil without producing trans fatty acids.

DISCLOSURE OF THE INVENTION

Therefore, the object of the present invention is to provide a method and an apparatus for producing purified botanical oil with no by-produced trans fatty acids, by purifying raw oil of the botanical oil under conditions not involving excessive heating and optionally hydrogenating it.

The present invention provides a method of producing botanical oil with no by-produced trans fatty acids comprising the steps of;

(1) introducing a raw oil obtained by squeezing plant seeds into a column having activated carbon filled therein from the upper part of a column;

(2) allowing the oil to transfer in the column by the action of gravity toward the lower part of the column and allowing the oil to discharge from the column through a filter cloth placed adjacent to the bottom part of the activated carbon layer, wherein the filter cloth has a pore size of 13 to 45 μm; and (3) introducing the oil discharged from the column into an activated carbon separation device comprising a filter having a pore size of 3-7 μm, and discharging from said separation device an oil having no activated carbon microparticles by the action of a sucking force.

The present invention also provides a method for producing botanical oil with no by-produced trans fatty acids further comprising the step of (4) introducing the obtained oil into a tower having hydrogen filled therein, spraying the oil from the top part of the tower towards the lower part of the tower and contacting the oil with hydrogen at a temperature of 50° C. or lower.

The present invention also provides an apparatus for producing purified botanical oil comprising;

(a) a botanical oil purification line comprising at least 2 botanical oil purification columns mounted in juxtaposition and in a way such that the line can be mutually switched, the column comprising an inlet for raw oil from plants on the upper part and an outlet for purified botanical oil at the bottom part, wherein a filter cloth having a pore size of 13 to 45 μm is placed at the bottom part of the column and the spacing above said filter cloth is filled with activated carbon to form an activated carbon layer, and (b) an activated carbon separation device comprising an inlet for introducing purified botanical oil and an outlet, and having mounted inside a filter for removing activated carbon remaining within the purified botanical oil.

The present invention also provides an apparatus as mentioned above further comprising;

(c) a spraying tower for contacting sprayed botanical oil with hydrogen filled within the tower, comprising a botanical oil spraying nozzle, a hydrogen gas inlet and a botanical oil outlet.

The present invention further provides an apparatus for producing purified botanical oil comprising;

(d) a vertical botanical oil purifying column having activated carbon filled therein comprising an aperture for botanical oil at the top part and the bottom part, wherein an activated carbon drop prevention means is mounted at said bottom part, said activated carbon drop prevention means formed by arranging a plurality of blade members with spacings in between wherein the blade members are in the shape of a truncated cone or pyramid with open upper and bottom ends, and closing the opening at the upper end of the uppermost blade member with a closure member, and (e) an activated carbon separation device comprising an inlet for introducing purified botanical oil and an outlet, and having mounted inside a filter for removing activated carbon remaining within the purified botanical oil.

The present invention enables the production of botanical oil with no by-produced trans fatty acids which are said to be harmful, due to the absence of excess heating during the steps of non-heating purification and non-heating hydrogenation. In addition, by adjusting the activated carbon-filled column, the filter cloth within the column, and the arrangement and the type of activated carbon-removing filter in the purifying step which utilizes activated carbon, the retention time of the botanical oil within the column is dramatically reduced to increase the activated carbon treatment rate, whereby the filtering ability of the activated carbon is brought about to its maximum and makes possible to carry out high level of purification. Furthermore, the purification step can be carried out more efficiently because, in addition to the improvement in the treatment rate, the operating life of the filter cloth and the filter is extended and the cost and energy necessary for the purification step is reduced.

Figure 1:
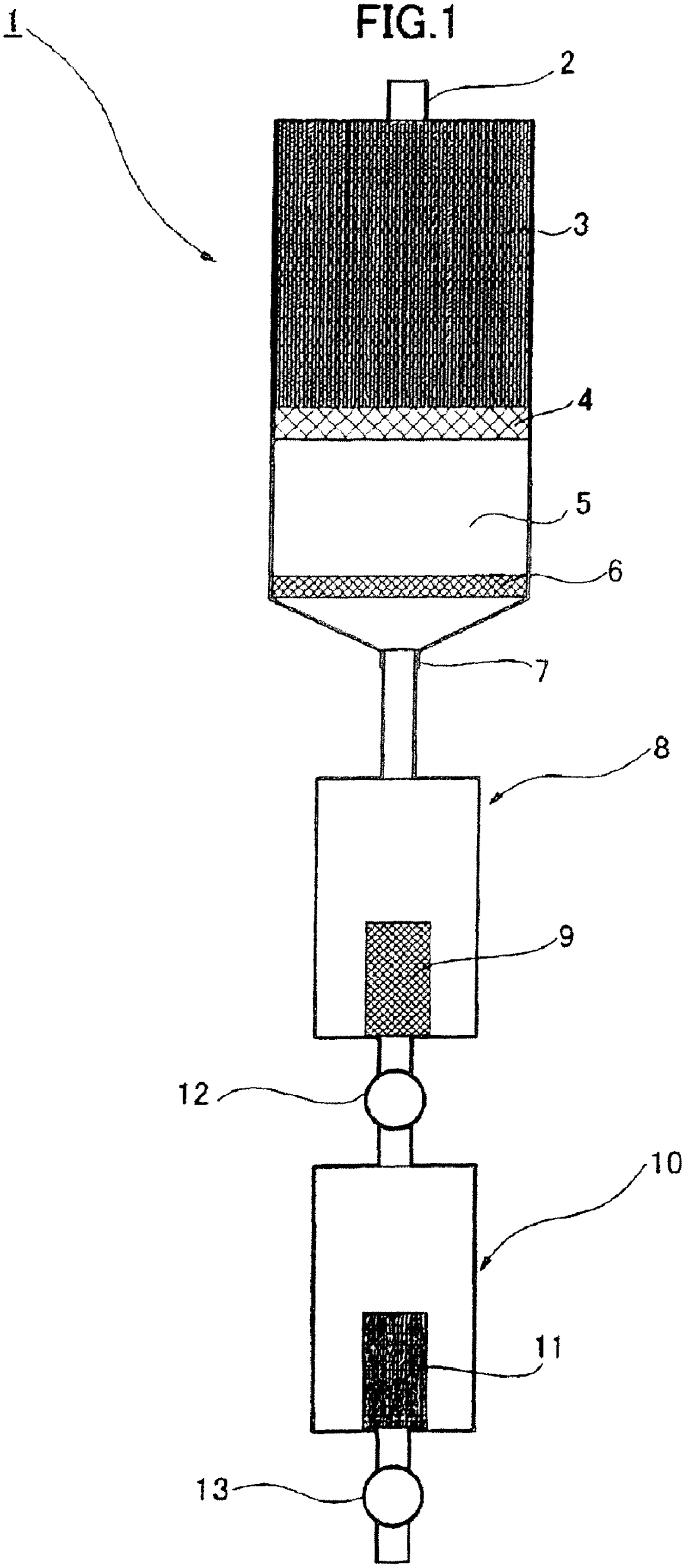
FIG. 1 shows an activated carbon-filled column used for purification of botanical oil and an activated carbon separation device.

1 activated carbon-filled column
3 activated carbon
4 filter cloth
6 filter cloth
8 activated carbon separation device
9 filter
10 activated carbon separation device
11 filter
14 spraying tower
15 botanical oil spraying nozzle
16 in-nozzle spacing
31 blade member
33 ejection
41 activated carbon drop prevention means
43 blade member
45 closure member
47 aperture
49 column

PREFERRED EMBODIMENTS FOR CARRYING OUT THE INVENTION

Raw oil from seeds of plants are used for the present invention. Seeds of plants may be any seed which comprises an oil component (in particular, seeds with a high content of oil referred to as oilseeds), including seeds of camellia, rape, safflower, corn, soy beans, etc. Seeds of camellia, for example, *Camellia oleifera* and *Camellia japonica* are preferred for the present invention. Raw oil can be obtained by squeezing the seeds of above plants or by extraction with chemical solvents such as hexane. However, since extraction by chemical solvents may chemically alter the botanical oil, it is preferable to obtain raw oil by squeezing in order to produce botanical oil which is closer to nature.

In the method of the present invention, the purification of botanical oil is carried out not with the commonly used method which comprises the steps such as adding water at high temperature to remove phopholipids, but by using activated carbon at normal temperatures. Resin, sugar, etc. are removed by passing the raw oil through activated carbon, at it also has the effect of decoloring and deodoring. Activated carbon having the above purifying abilities (such as absorption and decoloring abilities) are used, and may be made of any ingredients such as charcoal and coconut shell. Activated carbon having a particle size of, for example, 0.1 to 2.0 mm may be used. The particle size does not have to be uniform but can be, for example, a mixture of activated carbon of a particle size within the above range.

The purification of botanical oil using activated carbon can be evaluated for example by using "acid value" as an indication. Acid value is one example of a value to objectively indicate the extent of purification of botanical oil, and represents the amount of potassium hydroxide in mg necessary for neutralizing 1 g of a sample. The value can be calculated, for example, by adding and dissolving 25 ml of diethylether and 25 ml of ethanol to 5 g of botanical oil, titrating with 0.1 mol/l potassium hydroxide solution using phenolphthalein as an indicator, and measuring the amount of potassium hydroxide solution necessary for neutralization.

The acid value decreases as the botanical oil becomes more purified. In the present invention, it is possible to bring the acid value of the botanical oil to 2.0 or less, more preferably 1.5 or less, for example 1.0 or less, or even about 0.01 depending on the type of activated carbon.

The purification by activated carbon is carried out under conditions not involving excess heating, for example, at normal temperatures, for example, 10 to 40° C., preferably 20 to 30° C. The botanical oil transfers in the column by the action of gravity toward the lower part of the column. The amount of activated carbon within the column is 20 to 200 liters, preferably 40 to 100 liters, but can be varied according to the volume of the column used and the extent of purification necessary. It requires about 3 to 8 hours for the botanical oil to pass through the activated carbon.

In the method of the present invention, a filter cloth is located adjacent to the bottom part of the activated carbon layer. The filter cloth used are those having relatively large pore size which would enable to support the activated carbon layer mounted upstream but not reduce the transmission rate of the oil as possible. The preferable pore size is for example 8 to 45 μm, preferably 8 to 20 μm, more preferably 8 to 13 μm but can be varied according to the particle size of the activated carbon. The filter cloth may be of natural fiber or synthetic fiber and those made of polypropylene are used for example. By allowing the oil to pass through the filter cloth, it would be possible to remove particles of activated carbon of relatively large particle size (for example those with size of 13 μm or more) by which the clogging of filters (for example, those with pore size of 3 to 7 μm) during the activated carbon separating step described hereinafter is greatly reduced, and as a result, the procedures can be carried out without delay and at the same time, the operation life of the filter can be extended. As described above, by placing a filter cloth between the activated carbon layer and the filter, the clogging of filter will not occur in a short period of time and the transmission rate of the oil will not decrease rapidly as in the conventional methods. Therefore, it will be possible to let the oil pass through larger volume of activated carbon in the same length of time compared to the conventional method, and as a result, the extent of purification of oil can be improved.

It is preferable in the method of the present invention to, in the purification step using activated carbon, let the oil pass through a second filter cloth located downstream of the first filter cloth adjacent to the bottom part of the activated carbon layer with a spacing in between which is not filled with activated carbon (see FIG. 1), the second filter cloth having a smaller pore size compared to the first filter cloth. By arranging two filter cloths with a spacing in between, the one of a smaller pore size at downstream, the oil which passed through the first filter cloth drops to said spacing, and then passes through the second filter cloth located at the bottom of said spacing. The pore size of the first filter cloth located adjacent to the activated carbon is, for example, 13 to 20 μm, preferably 13 to 15 μm, and the pore size of the second filter cloth located at downstream is, for example, 8 to 13 μm, preferably 8 to 10 μm. The spacing between the first and the second filter cloths (i.e. the height of adjusting spacing) may be for example 5 to 10 cm, preferably 7 to 8 cm. By optionally using the adjusting spacing and the second filter cloth to carry out stepwise removal of activated carbon particles stepwise, as described above, the decrease of filtering rate at each filter cloth is minimized, whereby the retaining time of the botanical oil within the column is dramatically reduced and the activated carbon treatment rate is increased. The treatment rate can be reduced to, for example, about one half to one third compared to the conventional purifying method which does not use stepwise removal of activated carbon particles. Furthermore, the increase of the treatment rate will lead to bringing about the maximum filtering ability of the activated carbon and high-grade purification would be possible.

In one embodiment of the present invention, the apparatus of the present invention for purifying botanical oil has at least 2, for example 2 to 45, preferably 18 to 36 aforementioned columns mounted in juxtaposition and in a way such that the line can be mutually switched. The number of columns may be altered to, for example, 50 and even to 100 depending on to the amount of botanical oil that needs to be purified. By doing so, it will no longer be necessary to stop the purification process and wash and renew the activated carbon-filled column every time the clogging occurs, and instead the column whose activated carbon's operation life has expired can be simply exchanged and the purification of botanical oil can be carried out continuously. As shown, it is possible to reduce the time needed to deal with clogging and reduce the cost by using filter clogging-prevention means and exchangeable columns.

In another embodiment of the present invention, the same effect as that of the aforementioned filter cloth, i.e. avoid the drop of activated carbon and also obtain good filtering rate, can be obtained by placing, instead of said filter cloth, an activated carbon drop prevention means at the aperture at the bottom part of the column.

The botanical oil which passed through the activated carbon will then pass through the spacing between the blade members of the activated carbon drop prevention means from the outer side to the inner side, whereby relatively large particles of activated carbon can be removed from the botanical oil without reducing the transmission rate of the botanical oil. The botanical oil from which the particles are removed will then pass through the aperture at the bottom part of the column and be discharged from the column.

Figure 4:
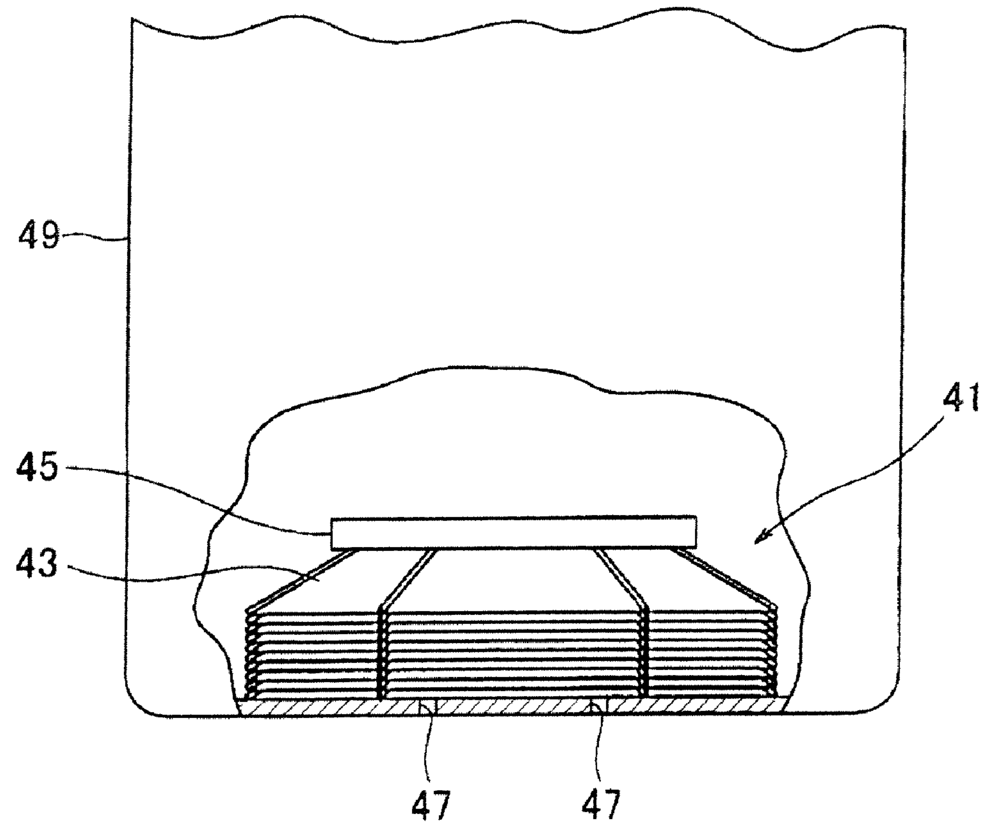
FIG. 4 shows an activated carbon drop prevention means.

With reference to FIG. 4 showing a preferred activated carbon drop prevention means used in the present invention, the activated carbon drop prevention means 41 is formed by arranging a plurality of blade members 43 with spacing in between wherein the blade members are in the shape of a truncated cone or pyramid with open upper and bottom ends, and closing the opening at the upper end of the uppermost blade member with a closure member 45.

Figure 3:
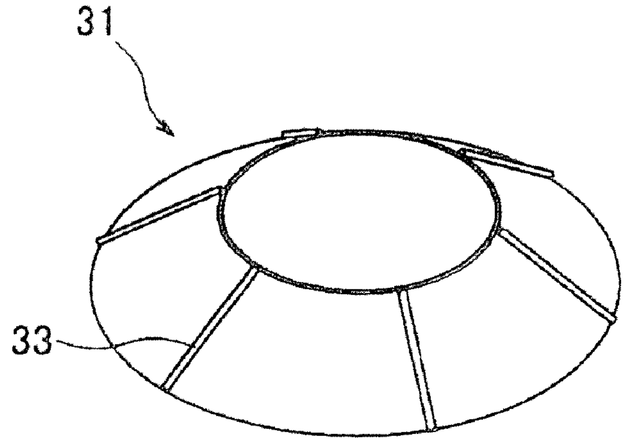
FIG. 3 shows a blade member.

With reference to FIG. 3, the material of blade member 31 has no limitation as long as it does not deteriorate the property of the botanical oil, and can be decided upon by a person skilled in the art in view of the ease of processing and can be, for example, stainless steel or aluminum, stainless steel being especially preferable.

The blade member 31 is in the shape of a truncated cone or pyramid with open upper and bottom ends. The truncated cone or pyramid may be any one of a truncated circular cone, truncated oval cone or truncated pyramid cone (for example, truncated triangular pyramid, truncated quadrangular pyramid, truncated pentangular pyramid, truncated hexagonal pyramid, etc.) and may be selected depending on the ease of processing and the shape of the column, and a truncated circular cone is preferable. The size of the blade member can be readily decided upon by a person skilled in the art in view of the size of the column, etc. In the case of the truncated circular cone, for example, the diameter of the circle of the upper end may be 2 to 20 cm, preferably 3 to 6 cm and the diameter of the circle of the lower end may be 5 to 30 cm, preferably 5 to 8 cm, provided that the diameter of the circle of the upper end is greater than the diameter of the circle of the lower end. The height of the blade member can be set at any value, but can be for example 1 to 5 cm, preferably 1 to 1.5 cm. The slant angle of the cone or pyramid can be set at a value which will enable the prevention of contamination of activated carbon particles in the botanical oil, and can be, for example, 20 to 60 degrees, preferably 35 to 55 degrees and more preferably 45 to 55 degrees (the slant angle of the side surface of a circular cylinder is defined as 90 degrees).

In the activated carbon drop prevention means 41, a plurality of blade members 43 are arranged with a spacing in between. Thus arranging the spacing, relatively large-sized activated carbon particles can be removed when the purified botanical oil passes between the blade members. In addition, by adjusting the gap of the spacing and the number of blades, the reduction of the transmission rate of oil is almost completely prevented. In particular, if the activated carbon drop prevention means is used, the same effect as that of the aforementioned filter cloth may be obtained, and at the same time, the transmission rate of the botanical oil can be improved, for example, nearly 3 times as much as that when the filter cloth is used.

The number of blade members to be arranged may be varied on a case by case basis depending on, for example, the size of the column and the desired treatment rate. For example, 5 to 50, preferably 15 to 25 blade members can be used.

The spacing between blade members where the botanical oil passes through may be configured by any known method, but preferably, the blade members 31 have ejections 33 on the upper of the lower surface to form a spacing. If the blade member 31 has the ejection 33, the adjacent blade members will not adhere to each other and will be able to obtain a spacing suitable for the botanical oil to pass through. There is no limitation for the shape of the ejection, and may be readily selected by a person skilled in the art based on, for example, the ease of processing and the flow of the botanical oil. When blade members are in the shape of a truncated circular cone, for example, the spacings between the blade members can be maintained generally even without inhibiting the flow of botanical oil by arranging for example 3, 4, 5, 6 or more ejections in positions equally apart, extending along the radius direction. See figure showing a preferable embodiment of a blade member.

The gap of the spacing between the blade members may vary depending on, for example, the particle size of the activated carbon, the size of the blade and the slant angle of the cone or pyramid, and a person skilled in the art can readily decide the value based on the standard, for example, that such value will enable to be removes relatively large sized activated carbon particles and at the same time, will not excessively reduce the transmission rate of the botanical oil. 0.05 to 2.5 mm, for example is preferred and 0.10 to 0.15 mm is more preferable.

The opening at the upper end of the uppermost blade member is closed with the closure member 45. The closure member may be of any material and shape as long as it is capable of closing the opening to prevent contamination or the drop of activated carbon. Preferably, the closure member is prepared in the same shape as that of the opening. Furthermore, the closure member 45 may be fixed by any method, for example, it may be fixed to a blade member and/or the inner wall of the column by a screw.

In another embodiment of the present invention, the aforementioned botanical oil purifying column may further comprise an activated carbon drop prevention means at the aperture at the upper part of the column, and may be arranged so that the column can be turned upside down. In general when using activated carbon columns, the purification ability of the activated carbon on the side which first contacts with the unpurified oil, i.e. the upstream side, is reduced faster than the activated carbon at the downstream side, and as a result, the yield ratio of the botanical oil, based on purification, is reduced. In order to prevent this, it is necessary to frequently exchange the activated carbon in the column, which is burdensome. Thus, by arranging an activated carbon drop prevention means not only at the bottom end of the column but also at the aperture at the upper end, and arranging the column so that it may be turned upside down in situ, the purification ability of the activated carbon, after a certain amount of botanical oil has been passed through, can be enhanced merely by turning the column upside down and, as a result the time and cost for exchanging the activated carbon can be greatly reduced.

In this connection, to turn the column upside down means that the positions of the aperture at the upper part and the bottom part are reversed. The column may be turned upside down by any technique known in the art, but is preferably turned upside down in situ, i.e. without taking the column out of the line. For example, the column may be turned upside down by arranging the device so as to rotate the column at the horizontal axis passing through the center of the column.

The botanical oil which is discharged from the aforementioned column comprising activated carbon and filter cloth is then introduced into an activated carbon separation device comprising a filter having a pore size of 3 to 7 μm, and the activated carbon particles which passed through the filter cloth (for example, those smaller than 7 μm) are removed. When doing so, since it is difficult for botanical oils to pass through filters (especially those having small pore sizes), the botanical oil free of activated carbon particles may optionally be discharged out from said separating device by the action of a sucking force. Filters used are those which are capable of removing activated carbon particles contaminated in botanical oils which have passed through the activated carbon-filled column, such as cartridge filters comprising polypropylene fibers. Suction is carried out using a pump at the rate of, for example, 2 to 3 liters per minute. In order to deal with the overflow of botanical oil due to the change of the filtering rate of the filter over time, it is possible to control the on/off of the pump by overflow sensors and by arranging pipes so that the overflowed botanical oil is returned to upstream.

In one embodiment, two or more activated carbon separation devices comprising filters of different pore sizes can be arranged and the oil is passed thorough the devices in an order from that having the larger pore size. For example, oil may be passed through an activated carbon separation device having a 7 μm filter, followed by an activated carbon separating device having a 3 μm filter. By optionally allowing the oil to sequentially pass through a plurality of activated carbon separating devices, the clogging of each filter is less likely to occur compared to when the oil is passed through a single filter, and the treatment rate is also improved. As a result, together with the aforementioned purification using activated carbon, the process efficiency of the overall purification process is improved.

Next, the purified botanical oil is introduced into the spraying tower and hydrogenation is carried out. The iodine value of the botanical oil is lowered by this step. Iodine value is a value indicating the amount of iodine in mg which can be added to 100 mg of oil, and the lower the iodine value is, the less the botanical oil is oxidized. This reaction step is preferably carried out by dispersively spraying the oil into the tower filled with hydrogen and physically contacting the oil with hydrogen. For example, oil pooled at the bottom part of the spraying tower can be sprayed again and be circulated, whereby the oil is sprayed into the hydrogen gas repeatedly and the iodine value can be reduced (see FIG. 2). A certain amount of purified botanical oil can be introduced into the hydrogenation device to carry out the hydrogenation treatment batchwise or the hydrogenation can be carried out continuously, for example, by preparing a line so that the purified botanical oil is introduced directly into the tank.

When carrying out the hydrogenation, the temperature and the spraying pressure of the botanical oil to be sprayed, the hydrogen pressure within the spraying tower, etc. are set to a suitable value. Trans fatty acids are likely to be produced if the oil is treated as in conventional methods under high temperature conditions (for example at 230° C.), thus the temperature of oil is maintained preferably at from normal temperature, such as 20° C., to 50° C., preferably 30 to 45° C., for example at 42° C. In order to carry out efficiently the contacting of oil and hydrogen, the content of hydrogen within the spraying tower is preferably high, for example 90% or more, and is preferably filled with 100% hydrogen. The pressure of hydrogen within the spraying tank is preferably 2 kgf/cm$^2$ or more, for example, 2 to 4.5 kgf/cm$^2$, for example 2 kgf/cm$^2$, and the spraying pressure of the oil is preferably set at 4.0 to 6.5 kgf/cm$^2$, and more preferably set at 6.0 to 6.5 kgf/cm$^2$. By making a difference in pressure between the hydrogen pressure and the oil spraying pressure (for example, a difference of 4.0 to 4.5 kgf/cm$^2$), the oil may be sprayed efficiently by high-pressure showering and be contacted with hydrogen. By spraying the oil sample into the spraying tower filled with hydrogen under the above conditions, the hydrogen binds to the carbon-carbon double bond of the polyunsaturated fatty acids and the iodine value is decreased. The way of contacting botanical oil with hydrogen is not limited to the embodiment described above. Hydrogen may be introduced directly into the space of the tank, as described above, but preferably hydrogen is introduced into the in-nozzle space where it is mixed with botanical oil and then sprayed into the tank. By using this method, the botanical oil can be made into a finer spray and the contacting area with hydrogen can be increased, resulting in more efficient hydrogenation. Other methods known in the art may also be used. For example, a flow of hydrogen may be produced in the spraying tower and be contacted with botanical oil in a counter-current or co-current style.

In the method of the present invention, all the steps, as mentioned above, are carried out without heating at high temperatures (e.g. the purification step is carried out at normal temperature using activated carbon, and the mixing with hydrogen is carried out at low temperatures such as 42° C.), and thus trans fatty acids which are said to be harmful to humans, are not by-produced. Most of the botanical oils that are currently commercially available are detected with about 1 to 18% of trans fatty acids, whereas the amount of trans fatty acids included in botanical oils produced with the method of the present invention is less than the 0.1% detectable limit (according to the test by Japan Institute of Oil & Fats, Other Foods Inspection Foundation). Therefore, one embodiment of the present invention is characterized in that the trans fatty acid content of the oil obtained by the method of the invention is less than 0.1%.

The preferable apparatus for producing purified botanical oil is now described below with reference to the figures.

FIG. 1 shows botanical oil purification column 1 filled with activated carbon, and activated carbon separation device 8 and 10 used to purify botanical oil of the invention. The purified botanical oil production device of the present invention has a plurality of activated carbon-filled columns 1 connected in juxtaposition, and each activated carbon-filled column comprises the activated carbon 3, filter cloth 4 adjacent to the bottom part of said activated carbon 3, spacing 5 at the downstream of the filter cloth, and filter cloth 6 at the bottom part of the spacing. The raw botanical oil flows down from the raw oil inlet 2 at the top part of the column and through the activated carbon 3, filter cloth 4, spacing 5 and filter cloth 6, and is discharged from botanical oil outlet 7 at the bottom part of the column. The details of the activated carbon and the filter cloths are as described hereinbefore.

Botanical oil which passed through the activated carbon-filled column is then sequentially introduced into the activated carbon separating device 8 and 10. Activated carbon separation devices 8 and 10 have arranged inside filters 9 and 11, respectively. Since botanical oil are first transmitted through a filter of larger pore size, as described before, the pore size of the filter 9 is larger than that of the filter 11. The details of the filters are as described hereinbefore. Pumps 12 and 13 are arranged for the suction of botanical oil.

Figure 2:
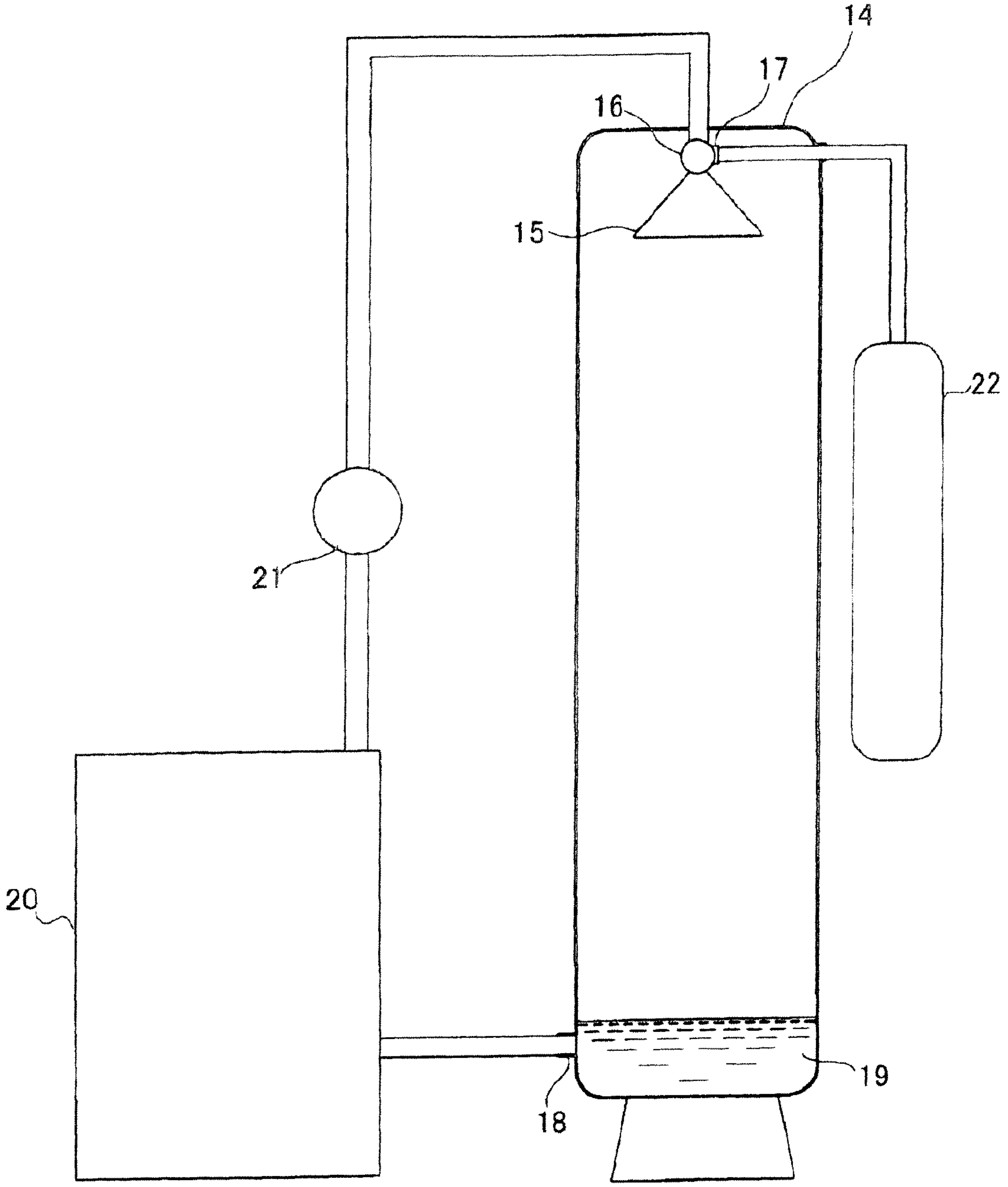
FIG. 2 shows a hydrogenation device.

FIG. 2 shows the preferred hydrogenation device of the present invention. The hydrogenation device has a spraying tower 14, said spraying tower comprising a botanical oil spraying nozzle 15 for spraying botanical oil, in-nozzle spacing 16 and hydrogen gas inlet 17 for introducing hydrogen into the in-nozzle spacing. As described hereinbefore, the hydrogen gas does not necessarily have to be introduced into the in-nozzle spacing, but can also be introduced from the top part of the spraying tower or can be, for example, introduced from the bottom part depending on the way of contacting botanical oil with hydrogen. Hydrogen gas is supplied from a hydrogen tank 22. Preferably, a botanical oil 19 taken out from an outlet 18 of the spraying tower enters a botanical oil tank 20 connected to the spraying tower, and the oil is sucked up by a pump 21, and is mixed with hydrogen in the in-nozzle spacing 16 after which it is sprayed into the spraying tower from the botanical oil spraying nozzle 15. A heater is placed inside the botanical oil tank and the temperature of the botanical oil is controlled. The setting temperature for the botanical oil is as described hereinbefore. Batchwise treatment can be carried out to repeatedly circulate a certain amount of purified botanical oil, or a line may be prepared so that the oil continuously passes through the activated carbon-filled column, activated carbon separation device and the hydrogenation device, and discharged.

A blade member of FIG. 3 and the activated carbon drop prevention means of FIG. 4 are as describe hereinbefore.

The examples of the present invention are described hereinafter, but the present invention should not to be limited to them.

EXAMPLES

1. Purification of Raw Oil of Botanical Oil by Activated Carbon Purification of raw oil of camellia oil was carried out. Seeds of camellia of *Camellia oleifera* were used as an ingredient, 3000 kg of said seed were squeezed to obtain 990 liters of raw camellia oil. Purification was carried out using an activated carbon-filled column and activated carbon separation device (see FIG. 1). 40 liters of activated carbon were filled inside a cylindrical column (20 cm diameter, 2 m tall). A 13 μm filter cloth was placed at the bottom part of the activated carbon layer, and an 8 μm filter cloth was placed with a spacing in between which was not filled with activated carbon. The filter cloth used was PYLEN twill-woven filter cloth P-606 of Japan Envirotic Industry Co., LTD. 18 columns were arranged in juxtaposition to prepare a purification line, and raw oil of camellia oil was allowed to pass through the activated carbon layer by the action of gravity. The oil which was transmitted through the activated carbon layer further passed through two filter cloths and was discharged from the column. All the 990 liters of raw oil was treated in a working time of about 9 hours.

Then, 3 activated carbon separation devices comprising a 7 μm filter and 6 activated carbon separation devices comprising a 3 μm filter were each connected in juxtaposition, pump suction was carried out and the oil was passed through the 7 μm filter and then through the 3 μm filter. The filter used was a BM filter (7 μm and 3 μm) of Chisso Corporation. The suction rate was approximately 3 liters/min. By this process, fine particles of activated carbon remaining in the oil were removed.

As a result of the above purification step, the acid value of camellia oil decreased from 2.5-3.8 to 0.7-1.2.

2. Contacting with Hydrogen

Using the aforementioned hydrogenation device of FIG. 2, botanical oil of camellia oil was contacted with hydrogen. A spraying tower of 22 liters in volume was used, and pipes were arranged so that the oil discharged from the bottom part of the spraying tank was introduced to a camellia oil tank and sprayed into the spraying tower again by a pump (see FIG. 2). The spraying tower was fully filled with camellia oil heated to 42° C., and was closed using a valve. Then the hydrogen valve was opened, and hydrogen at 2 kgf/cm$^2$ was injected from the top part of the column and at the same time the outlet valve was opened. By injecting hydrogen inside the column, oil was "pushed out" from the bottom part of the column into the camellia oil tank. The injection of hydrogen was continued until 5 liters of oil were remained at the bottom part of the spraying tower while the remaining 17 liters were filled with hydrogen at 2 kgf/cm$^2$. A heater was placed in the camellia oil tank and the temperature of the camellia oil was maintained at 42° C.

From this configuration, the camellia oil was circulated and was sprayed into the hydrogen within the spraying tower. The spraying pressure was maintained at 6.0 kgf/cm$^2$, and the hydrogen pressure inside the tower was maintained at 2.0 kgf/cm$^2$, and the botanical oil was circulated under this condition for 40 minutes. The circulation rate was 3 liters/min. As a result of this step, the iodine value of the oil decreased from 85.6 to 85.2. Furthermore, the content of trans fatty acids comprised in the final purified camellia oil was below the detection limit of 0.1%.

3. Purification with Botanical Oil Purification Column Comprising Activated Carbon Drop Prevention Means Activated carbon drop prevention means was prepared which had 22 blades stacked together, the blades in the shape of a truncated circular cone with the upper and lower ends open. The material of the blades was stainless steel, and the circle at the upper opening was 3.2 cm in diameter, the circle at the bottom opening was 5 cm in diameter and the height was 1.2 cm. The blade had 4 ejections extending along the radius direction, and the height of the ejections was 0.15 mm.

The activated carbon drop prevention means thus produced was set at the bottom aperture of the column of 20 cm in diameter and 2 m in height, and the column was filled with 135 kg of activated carbon LC of Sinochem Shanghai Corporation (mixture of particles having a particle size of 0.1 to 2 mm).

As a result, the filtration rate of the botanical oil was 11.64 liter/h, which was significantly higher than when using the 20 μm filter cloth (i.e. 2.64 liters/h) instead of the activated carbon drop prevention means (the conditions of the column, activated carbon, etc. were the same).

What is claimed is:

1. A method for producing botanical oil with no by-produced trans fatty acids comprising the steps of:

(1) introducing a raw oil obtained by squeezing plant seeds into a column having activated carbon filled therein from an upper part of the column;

(2) allowing the oil to transfer in the column by the action of gravity toward a lower part of the column and allowing the oil to pass through a first filter cloth placed adjacent to a bottom part of the activated carbon layer, wherein the filter cloth has a pore size of 13 μm to 45 μm, and allowing the oil to discharge from the column through a second filter cloth having a pore size of 8 μm to 13 μm located downstream of the first filter cloth with a spacing in between that is not filled with activated carbon; and (3) introducing the oil discharged from the column into an activated carbon separation device comprising a filter having a pore size of 3 μm-7 μm, and discharging from said separation device an oil having no activated carbon microparticles by the action of a sucking force.

2. The method according to claim 1 further comprising the step of;

(4) introducing the obtained oil into a tower having hydrogen filled therein, spraying the oil from the top part of the tower towards a lower part of the tower and contacting the oil with hydrogen at a temperature of 50° C. or lower.

3. The method according to claim 1 wherein the botanical oil is a camellia oil.

4. The method according to claim 1 wherein in step (3), the oil is passed through two or more activated carbon separation devices comprising filters of different pore sizes in an order from that having the larger pore size.

5. The method according to claim 1 wherein the acid value of the oil obtained in step (2) is from 0.01 to 1.5.

6. The method according to claim 1 wherein the content of trans fatty acids in the obtained oil is less than 0.1%.

7. An apparatus or producing purified botanical oil comprising:

(a) a botanical oil purification line comprising at least two botanical oil purification columns mounted in juxtaposition and in a way such that the line can be mutually switched, the column comprising an inlet for raw botanical oil on an upper part, an outlet for purified botanical oil at a bottom part, a first filter cloth having a pore size of 13 μm to 45 μm, the spacing above said first filter cloth filled with activated carbon to form an activated carbon layer, and a second filter cloth having a pore size of 8 μm to 13 μm placed at the bottom part of the column and downstream of the first filter cloth with a spacing in between which is not filled with activated carbon, and (b) an activated carbon separation device comprising an inlet for introducing purified botanical oil and an outlet, and having mounted inside a filter for removing activated carbon remaining within the purified botanical oil.

8. The apparatus for producing purified botanical oil according to claim 7 further comprising:

(c) a spraying tower for contacting sprayed botanical oil with hydrogen filled within the tower, comprising a botanical oil spraying nozzle, a hydrogen gas inlet and a botanical oil outlet.

* * * * *